US012640848B2

(12) United States Patent
Zhang et al.

(10) Patent No.: US 12,640,848 B2
(45) Date of Patent: May 26, 2026

(54) PACKET PROCESSING METHOD AND RELATED APPARATUS

(71) Applicant: HUAWEI TECHNOLOGIES CO., LTD., Guangdong (CN)

(72) Inventors: Yinxi Zhang, Nanjing (CN); Yinggen Wu, Shenzhen (CN); Zhengguo Li, Shenzhen (CN); Hao Li, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 18/358,667

(22) Filed: Jul. 25, 2023

(65) Prior Publication Data

US 2023/0370201 A1     Nov. 16, 2023

Related U.S. Application Data

(63) Continuation of application No. PCT/CN2022/073697, filed on Jan. 25, 2022.

(30) Foreign Application Priority Data

Jan. 25, 2021    (CN) ......................... 202110098203.9
Apr. 30, 2021    (CN) ......................... 202110486345.2

(51) Int. Cl.
*H04L 1/1607*        (2023.01)
*H04L 1/00*          (2006.01)

(52) U.S. Cl.
CPC .......... *H04L 1/1642* (2013.01); *H04L 1/0027* (2013.01)

(58) Field of Classification Search
None
See application file for complete search history.

(56) References Cited

U.S. PATENT DOCUMENTS

2021/0297351 A1 *    9/2021    Vegesna .............. H04L 12/4633

FOREIGN PATENT DOCUMENTS

| CN | 102791012 B | * | 6/2015 |
| CN | 109428801 A | | 3/2019 |
| CN | 109561021 A | | 4/2019 |
| CN | 109981470 A | | 7/2019 |

OTHER PUBLICATIONS

Machine Translation of CN-102791012-B (Year: 2015).*

* cited by examiner

*Primary Examiner* — Robert M Morlan

(57)        ABSTRACT

Embodiments of this application disclose a packet processing method and a related apparatus. The method includes: A network device receives n first packets sent by a terminal device, where each first packet includes one first sequence number field, and the first packet is an air interface packet. The network device determines a sending sequence of n second packets based on values of first sequence number fields of the n first packets, where each of the n second packets corresponds to one first packet. The network device sends the n second packets to a management platform or an application server based on the sending sequence.

12 Claims, 9 Drawing Sheets

Wireless access point

Plug-in card

Network device

Communication apparatus 800

801                                    802

Transceiver
module

Processing
module

PACKET PROCESSING METHOD AND RELATED APPARATUS

CROSS-REFERENCE TO RELATED APPLICATIONS

This application is a continuation of International Application No. PCT/CN2022/073697, filed on Jan. 25, 2022, which claims priority to Chinese Patent Application No. 202110486345.2, filed on Apr. 30, 2021, and to Chinese Patent Application No. 202110098203.9, filed on Jan. 25, 2021, and all of which are herein incorporated by reference in their entireties.

TECHNICAL FIELD

This application relates to the field of communication technologies, and in particular, to a packet processing method and a related apparatus.

BACKGROUND

With development of technologies, wireless Internet of things (IoT) systems are widely used in various industries, for example, an infant protection system and an intelligent transfusion system in the medical field, an asset management system of a smart campus, or an electronic shelf label system for shopping malls and supermarkets. These wireless Internet of things systems effectively reduce labor costs of enterprises and improve enterprise service efficiency.

Refer to FIG. 1a. An architecture of an existing wireless Internet of things system includes a terminal device, a network device, and a server. The terminal device is, for example, an electronic shelf label for shopping malls and supermarkets, a medical mother and infant wristband, or an asset tag of a smart campus. The network device serves as a gateway between the terminal device and the server, and is configured to access the terminal device. A short-distance Internet of things technology is usually used between the network device and the terminal device, for example, Zigbee, radio frequency identification (RFID), or a Bluetooth low energy (BLE) technology. Various application systems are deployed in the server. The terminal device, the network device, and the server may be referred to as a vertical system.

In the foregoing vertical system, because there are a plurality of transmission channels between the network device and each of the terminal device and the server, an out-of-order problem easily occurs during packet transmission. For example, the terminal device first sends a packet A, and then sends a packet B; and the network device first receives the packet B, and then receives the packet A. This out-of-order problem greatly affects actual service operations.

SUMMARY

According to a first aspect, an embodiment of this application provides a packet processing method, including:

A network device receives n first packets sent by a terminal device, where each first packet includes one first sequence number field. The network device determines a sending sequence of n second packets based on values of first sequence number fields of the n first packets, where each of the n second packets corresponds to one first packet.

The network device sends the n second packets to a management platform or an application server based on the sending sequence.

The first packet may be a data packet, a signaling packet, or another packet. This is not limited herein. For example, the first packet is an air interface packet. n is a positive integer greater than 1.

The first packet includes the first sequence number field, and the first sequence number field indicates a sending sequence of the first packet. Each first packet includes one first sequence number field. For example, when the terminal device sends the first packet at a moment 1, a value of the first sequence number field of the first packet is 1; when the terminal device sends the first packet at a moment 2, a value of the first sequence number field of the first packet is 2, where the moment 2 is greater than the moment 1, . . . , and the like. In other words, each time the terminal device sends one first packet, the value of the first sequence number field increases.

For example, the value of the first sequence number field is assigned by a counter in the terminal device. When the value of the first sequence number field in the counter reaches a threshold, for example, a value of the first sequence number field is 256 (represented by 8 bits), the counter is reset to 0 when the value of the first sequence number field continues to increase, that is, a value of the first sequence number field newly generated by the counter is 0, to reduce a field length of the first packet occupied by the first sequence number field.

In another implementation, each time the terminal device sends one first packet, the value of the first sequence number field decreases.

In this embodiment of this application, a network device receives n first packets sent by a terminal device, where each first packet includes one first sequence number field, and n is an integer greater than 1. The network device determines a sending sequence of n second packets based on values of first sequence number fields of the n first packets, where each of the n second packets corresponds to one first packet. The network device sends the n second packets to a management platform or an application server based on the sending sequence. A sequence number field used for sorting is added to a packet, so that the network device can learn of an actual sequence in which the terminal device sends packets, to avoid an out-of-order problem, thereby improving reliability of an Internet of things system.

With reference to the first aspect, in an implementation of the first aspect, the value of the first sequence number field indicates the sequence of the first packet, and the first sequence number field may be a sequence number or may be a timestamp. This is not limited herein.

The network device sends the n second packets to the management platform or the application server based on a sequence of n first sequence number fields included in the n first packets. The network device generates the n second packets based on the n first packets, where each second packet includes one second sequence number field, and each of the n second packets corresponds to one first packet. The second sequence number field may be a sequence number or may be a timestamp. This is not limited herein.

Optionally, a value of a second sequence number field included in an $n^{th}$ second packet has an increasing relationship with a value of a second sequence number field included in an $(n-1)^{th}$ second packet.

Optionally, alternatively, a value of a second sequence number field included in an $n^{th}$ second packet has a decreasing relationship with a value of a second sequence number field included in an $(n-1)^{th}$ second packet.

For example, the n first packets include a first packet A, a first packet B, a first packet C, and a first packet D. The four first packets are sorted based on four corresponding first sequence number fields. A sequence is: the first packet A, the first packet B, the first packet C, and the first packet D. In other words, four second packets generated based on the four first packets are sent in the foregoing sequence. Optionally, the second packet is consistent with the first packet. In this embodiment of this application, the network device forwards the first packet, and the first packet sent by the network device is referred to as the second packet. For example, an actual receiving sequence of the n first packets received by the network device is: the first packet A, the first packet C, the first packet B, and the first packet D. In this case, the network device forwards the four first packets based on a sequence of values of first sequence number fields, where a sending sequence is: a second packet A, a second packet B, a second packet C, and a second packet D. By using a plurality of methods, the network device can determine the sending sequence of sending the n second packets, thereby improving implementation flexibility of the solution.

With reference to the first aspect, in an implementation of the first aspect, that a network device receives n first packets sent by a terminal device includes: The network device receives in a first time period, the n first packets sent by the terminal device, where when the terminal device sends a total of m first packets to the network device in the first time period, m is greater than or equal to n.

In the first time period, the terminal device sends the m first packets to the network device. In the first time period, the network device receives the n first packets sent by the terminal device. Herein, m is greater than or equal to n. In other words, a quantity of first packets actually received by the network device is less than or equal to a quantity of the first packet actually sent by the terminal device. The network device sends the n first packets to the management platform or the application server based on the values of the first sequence number fields of the n received first packets.

For example, the first time period is five seconds. In the first time period, the terminal device sends the four (m=4) first packets to the network device, and the network device receives the four (n=4) first packets sent by the terminal device, that is, m=n=4. For example, the terminal device sends the four first packets every five seconds. When the network device receives the four first packets in the first time period (five seconds), the network device determines a sending sequence based on a sequence of values of four first sequence number fields corresponding to the four first packets. The network device sends the four second packets based on the sending sequence. By using a plurality of methods, the network device can determine the sending sequence of sending the n second packets, thereby improving implementation flexibility of a solution.

In still another example, when the terminal device sends m first packets to the network device in the first time period, the network device receives the n first packets sent by the terminal device, and m is greater than n. For example, the first time period is five seconds. The terminal device sends the four (m=4) first packets to the network device. For example, the terminal device sends the four first packets every five seconds. However, the network device receives only three (n=3) first packets in the first time period. First packets actually received by the network device in the first time period are the first packet B, the first packet C, and the first packet D.

The network device determines, based on values of first sequence number fields included in n first packets (the first packet B, the first packet C, and the first packet D), that a sequence of the values of n first sequence number fields is the first packet B, the first packet C, and the first packet D.

The network device determines the sending sequence of the n second packets based on the sequence of the values of the n first sequence number fields. The network device sends the n second packets to the management platform or the application server based on the sending sequence. The network device generates the n second packets based on the n first packets. The n second packets are the second packet B (corresponding to the first packet B), the second packet C (corresponding to the first packet C), and the second packet D (corresponding to the first packet D). The network device sends the n second packets to the management platform or the application server based on the sequence of the n second packets. A sending sequence is: the second packet B (corresponding to the first packet B), the second packet C (corresponding to the first packet C), and the second packet D (corresponding to the first packet D). In addition, in a next time period, even if the network device receives a first packet (for example, the first packet A) that does not arrive in a previous period, the first packet is discarded, and is not sorted with a first packet received in the next time period.

By using a plurality of methods, the network device can determine the sending sequence of sending the n second packets, thereby improving implementation flexibility of a solution. In addition, the network device processes packets in a correct sequence to ensure normal service operations.

With reference to the first aspect, in an implementation of the first aspect, the method further includes: When the terminal device sends m first packets to the network device in the first time period, the network device receives the n first packets sent by the terminal device, where m is greater than n; and the network device discards the n first packets.

When the terminal device sends the m first packets to the network device in the first time period, the network device receives the n first packets sent by the terminal device, where m is greater than or equal to n, and n is a quantity of first packets sent by the terminal device to the network device in the first time period. For example, the first time period is five seconds. The network device and the terminal device agree that the terminal device sends the four (m=4) first packets to the network device in the first time period. For example, the terminal device sends the four first packets (the first packet A, the first packet B, the first packet C, and the first packet D) every five seconds. However, the network device receives only three (n=3) first packets in the first time period. First packets actually received by the network device in the first time period are the first packet B, the first packet C, and the first packet D.

The network device discards the n first packets (the first packet B, the first packet C, and the first packet D). The network device receives the first packet from the terminal device in a next first time period, and determines whether to send the second packet to the management platform or the application server.

By using a plurality of methods, the network device can determine the sending sequence of sending the n second packets, thereby improving implementation flexibility of a solution. In addition, the network device processes packets in a correct sequence to ensure normal service operations.

With reference to the first aspect, in an implementation of the first aspect, each of the n second packets includes one second sequence number field, and a value of the second sequence number field indicates a rank of the second packet.

With reference to the first aspect, in an implementation of the first aspect, the value of the second sequence number field includes a sequence number and/or a timestamp. For example, the timestamp may be a timestamp starting from midnight every day.

With reference to the first aspect, in an implementation of the first aspect, the first sequence number field is located in a data field of the first packet; and the second sequence number field is located in a data field of the second packet.

According to a second aspect, an embodiment of this application provides a packet processing method, including:

A terminal device generates a first packet, where the first packet includes a first sequence number field, a value of the first sequence number field indicates a rank of the first packet, and the first sequence number field is located in a data field of the first packet.

The terminal device sends the first packet to the network device.

In this embodiment of this application, the terminal device generates the first packet. The first packet includes the first sequence number field. The value of the first sequence number field indicates the sequence of the first packet. The first sequence number field is located in the data field of the first packet. The first sequence number field is a newly constructed field in this embodiment of this application. The terminal device sends the first packet to the network device. The network device determines a sending sequence of n second packets based on values of first sequence number fields of first packets. Each of the n second packets corresponds to one first packet. A sequence number field used for sorting is added to a packet, so that the network device can learn of an actual sequence in which the terminal device sends packets, to avoid an out-of-order problem, thereby improving reliability of an Internet of things system.

With reference to the second aspect, in an implementation of the second aspect, the method further includes: The value of the first sequence number field is reset when the value of the first sequence number field reaches a first threshold. According to the foregoing method, storage space occupied by the first sequence number field in the first packet is saved, and communication resources are saved.

According to a third aspect, an embodiment of this application provides a packet processing method, including:

A management platform receives n second packets sent by a network device, where each second packet includes one second sequence number field, a value of the second sequence number field indicates a rank of the second packet, each of the n second packets corresponds to one first packet, and the first packet is an air interface packet received by the network device from a terminal device; and the management platform processes the n second packets.

In this embodiment of this application, the management platform receives the n second packets sent by the network device. Each second packet includes one second sequence number field. The value of the second sequence number field indicates the sequence of the second packet. Each of the n second packets corresponds to one first packet. The first packet is the air interface packet received by the network device from the terminal device. The management platform determines the sequence of the second packet based on values of second sequence number fields of the n second packets. The management platform processes the n second packets based on the sequence. A sequence number field used for sorting is added to a packet, so that the management platform can learn of an actual sequence in which the network device sends packets, to avoid an out-of-order problem, thereby improving reliability of an Internet of things system.

With reference to the third aspect, in an implementation of the third aspect, the value of the second sequence number field indicates the sequence of the second packet, and the second sequence number field may be a sequence number or may be a timestamp. This is not limited herein.

Each second packet includes one second sequence number field, and each of the n second packets corresponds to one first packet.

Optionally, a value of a second sequence number field included in an $n^{th}$ second packet has an increasing relationship with a value of a second sequence number field included in an $(n-1)^{th}$ second packet.

Optionally, alternatively, a value of a second sequence number field included in an $n^{th}$ second packet has a decreasing relationship with a value of a second sequence number field included in an $(n-1)^{th}$ second packet. With reference to the third aspect, in an implementation of the third aspect, that a management platform receives n second packets sent by a network device includes: The management platform receives the n second packets sent by the network device in a second time period. When the network device sends a total of m second packets to the management platform in the second time period, m is greater than or equal to n.

In the second time period, the network device sends the m second packets to the management platform. In the second time period, the management platform receives the n second packets sent by the network device. Herein, m is greater than or equal to n. In other words, a quantity of second packets actually received by the management platform is less than or equal to a quantity of second packets actually sent by the network device. The management platform determines a sending sequence of the n second packets based on the values of the second sequence number fields of the received n second packets. The management platform processes the n second packets based on the sending sequence. For example, the management platform sends the n second packets to an application server based on the sending sequence.

For example, the second time period is five seconds. In the second time period, the network device sends four (m=4) second packets to the management platform, and the management platform receives the four (n=4) second packets sent by the network device, that is, m=n=4. For example, the network device sends the four second packets every five seconds. If the management platform receives the four second packets in the second time period (five seconds), the management platform determines a sending sequence based on a sequence of values of four second sequence number fields corresponding to the four second packets. The management platform sends the four second packets to the application server based on the sending sequence. By using a plurality of methods, the management platform can determine the sending sequence of sending the n second packets, thereby improving implementation flexibility of a solution.

In still another example, when the network device sends the m second packets to the management platform in the second time period, the management platform receives the n second packets sent by the network device, and m is greater than n. For example, the second time period is five seconds. The network device sends the four (m=4) second packets to the management platform. For example, the network device sends the four second packets every five seconds. However, the management platform receives only three (n=3) second packets in the second time period. Second packets actually received by the management platform in the second time period are a first packet B, a first packet C, and a first packet D.

The management platform determines, based on the values of the second sequence number fields included in the n second packets (a second packet B, a second packet C, and a second packet D), that a sequence of the values of n second sequence number fields is the second packet B, the second packet C, and the second packet D.

The management platform determines the sending sequence of the n second packets based on the sequence of the values of the n second sequence number fields. The management platform sends the n second packets to the application server based on the sending sequence. A sending sequence is: the second packet B, the second packet C, and the second packet D. In addition, in a next time period, even if the management platform receives a second packet (for example, a second packet A) that does not arrive in a previous period, the second packet is discarded, and is not sorted with a second packet received in the next time period.

By using a plurality of methods, the management platform can determine the sending sequence of sending the n second packets, thereby improving implementation flexibility of a solution. In addition, the management platform processes packets in a correct sequence to ensure normal service operations.

With reference to the third aspect, in an implementation of the third aspect, the method further includes: The network device sends the m second packets to the management platform in the second time period, the management platform receives the n second packets sent by the network device, where m is greater than n; and the management platform discards the n second packets.

When the network device sends the m second packets to the management platform in the second time period, the management platform receives the n second packets sent by the network device. m is greater than or equal to n, and n is a quantity of second packets sent by the network device to the management platform in the second time period. For example, the second time period is five seconds. The management platform and the network device agree that the network device sends the four (m=4) second packets to the management platform in the second time period. For example, the network device sends the four second packets (the second packet A, the second packet B, the second packet C, and the second packet D) every five seconds. However, the management platform receives only three (n=3) second packets in the second time period. Second packets actually received by the management platform in the second time period are a first packet B, a first packet C, and a first packet D.

The management platform discards the n second packets (the second packet B, the second packet C, and the second packet D). The management platform receives a second packet from the network device in a next second time period, and determines whether to send the second packet to the application server.

By using a plurality of methods, the management platform can determine the sending sequence of sending the n second packets, thereby improving implementation flexibility of a solution. In addition, the management platform processes packets in a correct sequence to ensure normal service operations.

According to a fourth aspect, an embodiment of this application provides a communication apparatus, including:

a transceiver module, configured to receive n first packets sent by a terminal device, where each first packet includes one first sequence number field; and a processing module, configured to determine, by a network device, a sending sequence of n second packets based on values of first sequence number field of the n first packets, where each of the n second packets corresponds to one first packet.

The transceiver module is further configured to send the second packet to a management platform or an application server based on the sending sequence.

In an implementation, the transceiver module is configured to receive the n first packets sent by the terminal device in the first time period. When the terminal device sends a total of m first packets to the network device in the first time period, m is greater than or equal to n.

In an implementation, the transceiver module is configured to receive the n first packets sent by the terminal device, including: the network device receives the n first packets sent by the terminal device in the first time period. When the terminal device sends a total of m first packets to the network device in the first time period, m is greater than n.

The processing module is further configured to discard the n first packets.

In an implementation, each of the n second packets includes one second sequence number field, and a value of the second sequence number field indicates a rank of the second packet.

In an implementation, the first sequence number field is located in a data field of the first packet, and the second sequence number field is located in a data field of the second packet.

In an implementation, the value of the second sequence number field includes a sequence number and/or a timestamp.

According to a fifth aspect, an embodiment of this application provides a communication apparatus, including:

a processing module, configured to generate a first packet, where the first packet includes a first sequence number field, a value of the first sequence number field indicates a rank of the first packet, and the first sequence number field is located in a data field of the first packet; and a transceiver module, configured to send the first packet to a network device.

In an implementation, the first sequence number field is located in a data field of the first packet.

In an implementation, the processing module is further configured to reset the value of the first sequence number field when the first sequence number field reaches a value of a first threshold.

According to a sixth aspect, an embodiment of this application provides a communication apparatus, including:

a transceiver module, configured to receive n second packets sent by a network device, where each second packet includes one second sequence number field, a value of the second sequence number field indicates a rank of the second packet, each of the n second packets corresponds to one first packet, and the first packet is an air interface packet received by the network device from a terminal device; and a transceiver module is configured to send the n second packets to an application server.

In an implementation, the transceiver module is configured to receive the n second packets sent by the network device in a second time period. When the network device sends a total of m second packets to a management platform in the second time period, m is greater than or equal to n.

In an implementation, the transceiver module is configured to receive the n second packets sent by the network device in a second time period. When the network device sends a total of m second packets to a management platform in the second time period, m is greater than n.

The communication apparatus further includes a processing module, configured to discard the n second packets.

In an implementation, the second sequence number field is located in a data field of the second packet.

In an implementation, the value of the second sequence number field includes a sequence number and/or a time-stamp.

According to a seventh aspect, an embodiment of this application provides a communication apparatus. The communication apparatus may implement functions performed by the terminal device, the network device, or the management platform in the method in the first aspect, the second aspect, or the third aspect. The communication apparatus includes a processor, a memory, a receiver connected to the processor, and a transmitter connected to the processor. The memory is configured to store program code, and transmit the program code to the processor. The processor is configured to drive, based on instructions in the program code, the receiver and the transmitter to perform the method in the first aspect, the second aspect, or the third aspect. The receiver and the transmitter are separately connected to the processor, to perform operations of the terminal device, the network device, or the management platform in the method in the foregoing aspects. The transmitter may perform a sending operation, and the receiver may perform a receiving operation. Optionally, the receiver and the transmitter may be a radio frequency circuit, and the radio frequency circuit receives and sends a message by using an antenna. Alternatively, the receiver and the transmitter may be a communication interface, the processor is connected to the communication interface by using a bus, and the processor receives or sends a message through the communication interface.

According to an eighth aspect, an embodiment of this application provides a communication apparatus. The communication apparatus may include an entity such as a network device or a chip. The communication apparatus includes a processor and a memory. The memory is configured to store instructions. The processor is configured to execute the instructions in the memory, so that the communication apparatus performs any method in either the first aspect or the third aspect.

According to a ninth aspect, an embodiment of this application provides a communication apparatus. The communication apparatus may include an entity such as a terminal device or a chip. The communication apparatus includes a processor and a memory. The memory is configured to store instructions. The processor is configured to execute the instructions in the memory, so that the communication apparatus performs any method in the second aspect.

According to a tenth aspect, an embodiment of this application provides a computer-readable storage medium storing one or more computer-executable instructions. When the computer-executable instructions are executed by a processor, the processor performs any one of the implementations of the first aspect, the second aspect, or the third aspect.

According to an eleventh aspect, an embodiment of this application provides a computer program product (which is also referred to as a computer program) storing one or more computer-executable instructions. When the computer-executable instructions are executed by a processor, the processor performs any one of the implementations of the first aspect, the second aspect, or the third aspect.

According to a twelfth aspect, this application provides a chip system. The chip system includes a processor, configured to support a computer device in implementing functions in the foregoing aspects. In a design, the chip system further includes a memory. The memory is configured to store program instructions and data that are necessary for the computer device. The chip system may include a chip, or may include a chip and another discrete device.

According to a thirteenth aspect, this application provides a communication system. The communication system includes the communication apparatus in the fourth aspect, the fifth aspect, or the sixth aspect.

DESCRIPTION OF EMBODIMENTS

In the specification, claims, and accompanying drawings of this application, terms "first", "second", and the like are intended to distinguish between similar objects but do not necessarily indicate an order or sequence. It should be understood that the terms used in this way may be interchanged in appropriate cases, and this is merely a manner of distinguishing between objects with a same attribute for description in embodiments of this application. Moreover, terms "including" and "with" and any variations thereof are intended to cover non-excluding inclusions, so that a process, method, system, product, or device that includes a series of units is not necessarily limited to those units, but may include other units not expressly listed or inherent to such a process, method, system, product, or device.

The following clearly describes technical solutions in embodiments of this application with reference to the accompanying drawings in embodiments of this application. In descriptions of this application, "I" means "or" unless otherwise specified. For example, AB may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one (piece) of a, b, or c may indicate a, b, c, a and b, a and c, b and c, or a, b, and c, where a, b, and c may be singular or plural.

Figure 1A:
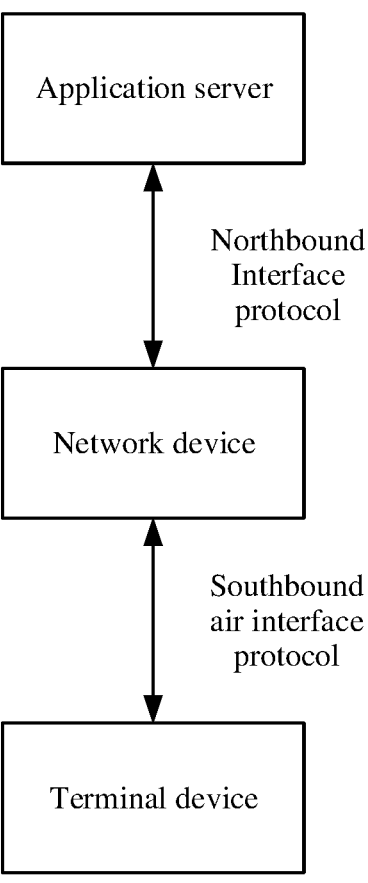
FIG. 1a is a diagram of an Internet of things system according to an embodiment of this application.
Figure 1B:
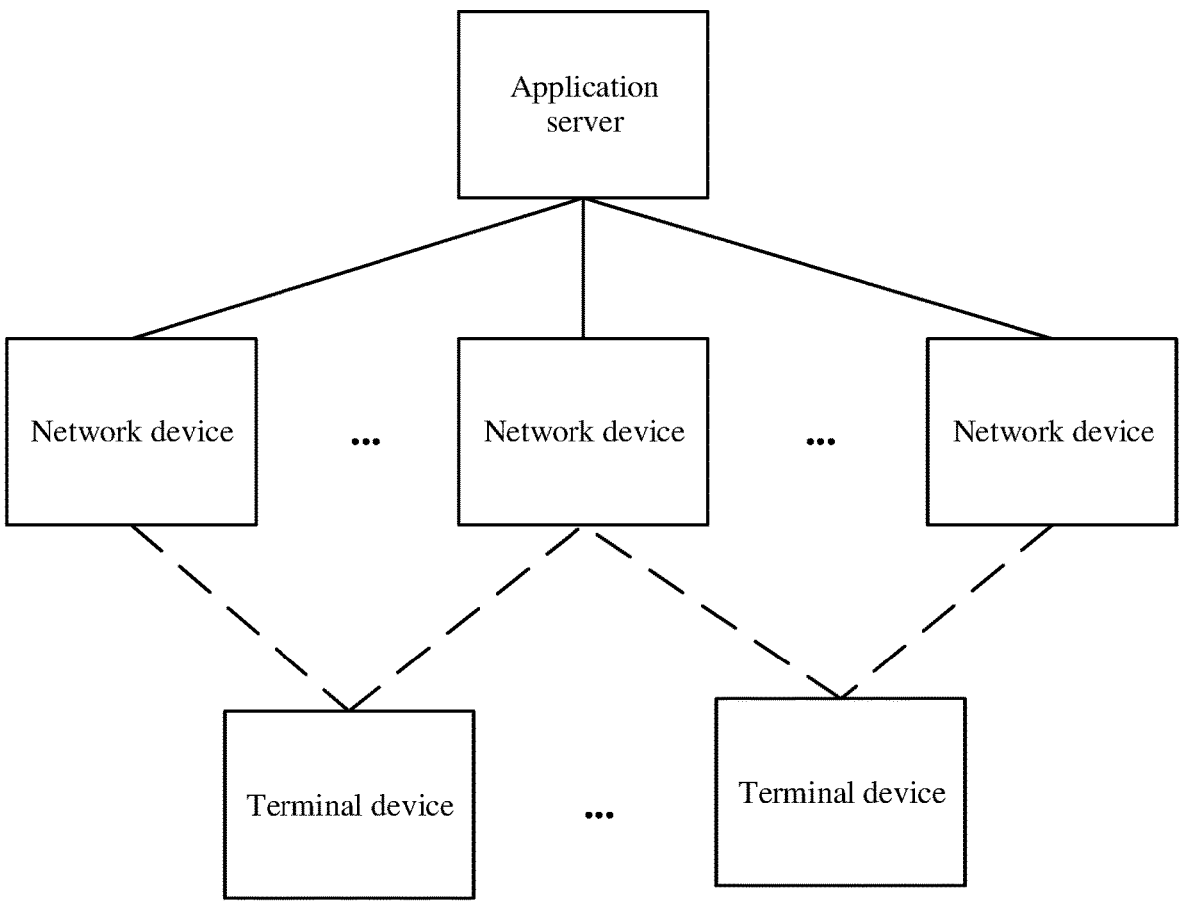
FIG. 1B is a diagram of an application scenario according to an embodiment of this application.

First, some application scenarios of this solution are introduced. FIG. 1B is a diagram of an application scenario according to an embodiment of this application. A vertical system includes a terminal device, a network device, and an application server. The terminal device is, for example, an electronic shelf label for shopping malls and supermarkets, a medical mother and infant wristband, or an asset tag of a smart campus. The network device serves as a gateway between the terminal device and the application server, and is configured to access the terminal device. A southbound air interface protocol between the network device and the terminal device usually uses a short-distance Internet of things technology, for example, Zigbee, radio frequency identification (RFID), or a Bluetooth low energy (BLE) technology. Various application systems are deployed in the application server. A northbound interface protocol between the application server and the network device usually uses a user datagram protocol (UDP), a hypertext transfer protocol (HTTP), or the like.

For example, one application system is deployed on one application server. The application system may be an infant protection system of a vendor A. A plurality of network devices (supporting the vendor A) establish a communication connection to an application server A on which the infant protection system is deployed, so that the infant protection system covers a large area.

The application system may alternatively be a material management system of a vendor B. A plurality of network devices (supporting the vendor B) establish a communication connection to an application server B on which the material management system is deployed, so that the material management system covers a large area.

Packets (instructions or data) of the terminal device may be out of order during transmission, and out-of-order packets may greatly affect the entire system. For example, the terminal device is a temperature and humidity sensor. The application server may determine a response handling policy based on a temperature threshold sensed by the terminal device. If a temperature exceeds the threshold from a low temperature to a high temperature, the application server generates an alarm. If the temperature is from a high temperature to a low temperature, the system runs normally and cancels the alarm. When an out-of-order problem occurs, an alarm may be falsely reported. For example, temperature data reported by the terminal device originally and gradually decreases from a high temperature to a low temperature. In this case, the application server determines whether the application server is running normally based on the reported temperature data. However, due to the out-of-order problem, temperature data received by the application server gradually increases from a low temperature to a high temperature. The application server sends the alarm based on the reported temperature data. Actual system operations are affected.

In this embodiment of this application, the network device receives n first packets sent by the terminal device, and each first packet includes one first sequence number field. The network device determines a sending sequence of n second packets based on values of first sequence number fields of the n first packets, and each of the n second packets corresponds to one first packet. The network device sends the second packet to a management platform or an application server based on the sending sequence. A sequence number field used for sorting is added to a packet, so that the network device can learn of an actual sequence in which the terminal device sends packets, to avoid an out-of-order problem, thereby improving reliability of an Internet of things system.

Figure 2:
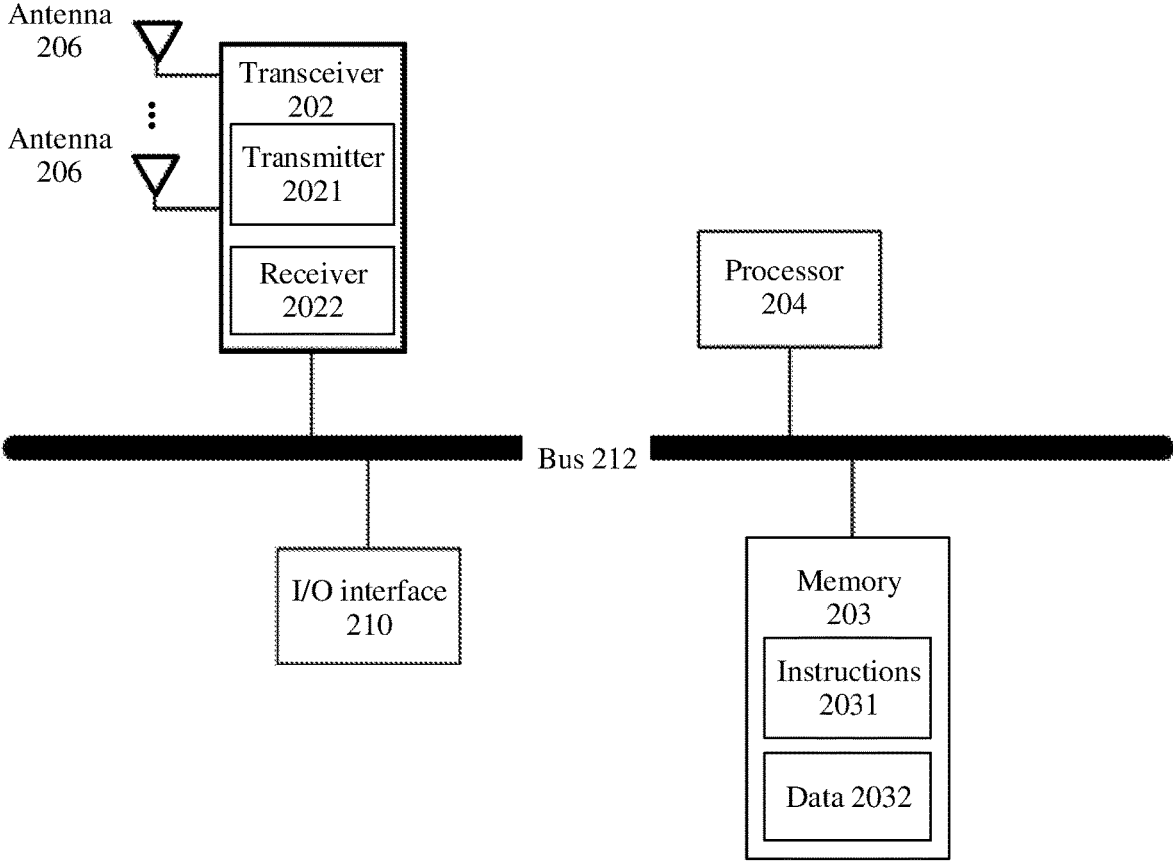
FIG. 2 is a diagram of a communication apparatus according to an embodiment of this application.

FIG. 2 is a diagram of a communication apparatus according to an embodiment of this application. The communication apparatus may be an implementation of a terminal device, a network device, and/or a management platform in this embodiment of this application. As shown in FIG. 2, the communication apparatus includes at least a processor 204, a memory 203, and a transceiver 202. The memory 203 is further configured to store instructions 2031 and data 2032. Optionally, the communication apparatus may further include an antenna 206, an input/output (I/O) interface 210, and a bus 212. The transceiver 202 further includes a transmitter 2021 and a receiver 2022. In addition, the processor 204, the transceiver 202, the memory 203, and the I/O interface 210 are communicatively connected to each other by using the bus 212. The antenna 206 is connected to the transceiver 202.

The processor 204 may be a general-purpose processor, for example, but not limited to, a central processing unit (CPU), or may be a dedicated processor, for example, but not limited to, a digital signal processor (DSP), an application-specific integrated circuit (ASIC), and a field programmable gate array (FPGA). Alternatively, the processor 204 may be a neural network processing unit (NPU). In addition, the processor 204 may alternatively be a combination of a plurality of processors. In particular, in technical solutions provided in embodiments of this application, the processor 204 may be configured to perform related steps of a packet processing method in subsequent method embodiments. The processor 204 may be a processor that is specially designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes the transmitter 2021 and the receiver 2022. In an optional implementation, the transmitter 2021 is configured to send a signal by using the antenna 206. The receiver 2022 is configured to receive the signal by using at least one of antennas 206. In particular, in technical solutions provided in embodiments of this application, the transmitter 2021 may be configured to perform an operation by using the at least one of antennas 206, for example, an operation performed by a receiving module or a sending module in the network device when a packet processing method in a subsequent method embodiment is applied to the network device.

In this embodiment of this application, the transceiver 202 is configured to support the communication apparatus in performing the foregoing receiving function and sending function. A processor having a processing function is considered as the processor 204. The receiver 2022 may also be referred to as an input port, a receiver circuit, or the like. The transmitter 2021 may be referred to as a transmitter, a transmitter circuit, or the like.

The processor 204 may be configured to execute instructions stored in the memory 203, to control the transceiver 202 to receive a message and/or send a message, to complete functions of the communication apparatus in method embodiments of this application. In an implementation, it may be considered that a function of the transceiver 202 is implemented by using a transceiver circuit or a dedicated transceiver chip. In this embodiment of this application, that the transceiver 202 receives a message may be understood as that the transceiver 202 inputs a message, and that the transceiver 202 sends a message may be understood as that the transceiver 202 outputs a message.

The memory 203 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 203 is configured to store the instructions 2031 and the data 2032. The processor 204 may perform the steps and/or the operations in method embodiments of this application by reading and executing the instructions 2031 stored in the memory 203. The data 2032 may need to be used in a process of performing the operations and/or the steps in method embodiments of this application.

Optionally, the communication apparatus may further include the I/O interface 210. The I/O interface 210 is configured to receive instructions and/or data from a peripheral device, and output instructions and/or data to the peripheral device.

The following describes two implementation solutions provided in embodiments of this application with reference to the accompanying drawings.

Figure 3A:
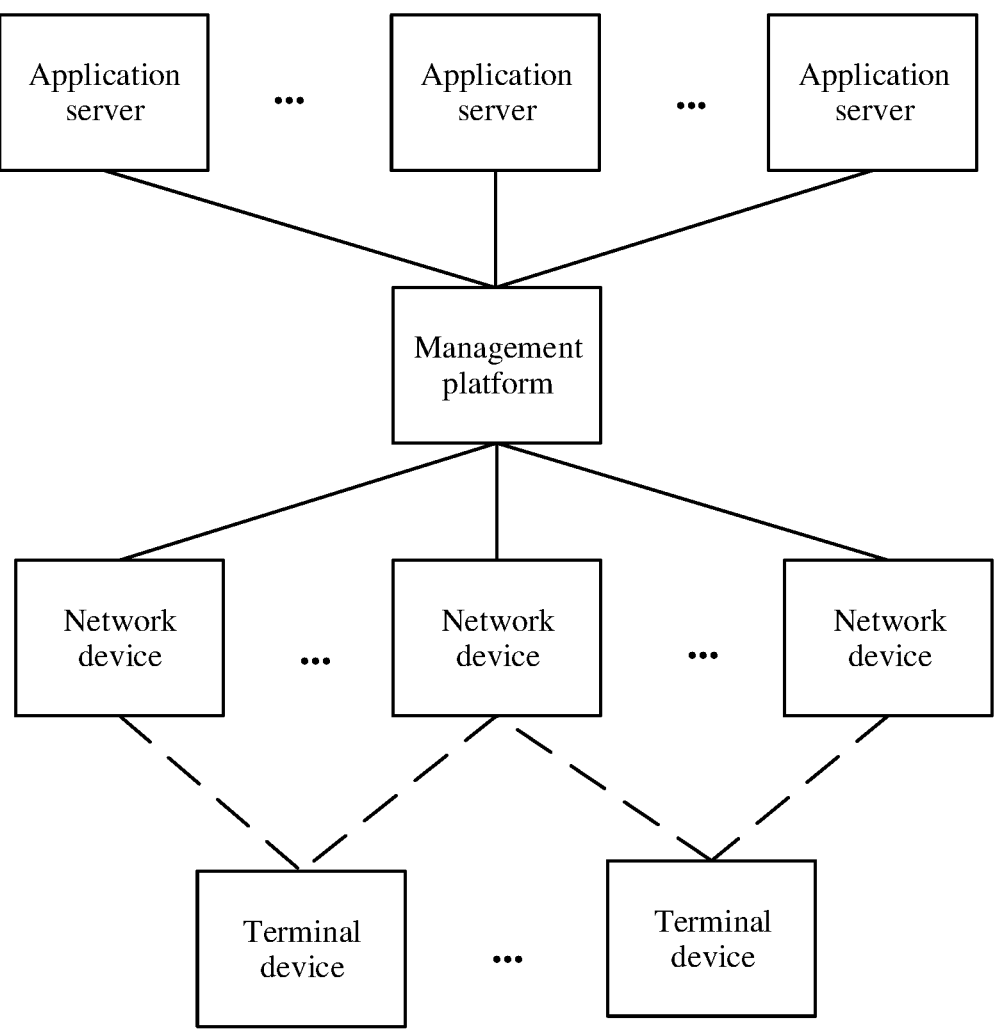
FIG. 3a is a diagram of an application scenario according to an embodiment of this application.

(A) A management platform is used as an intermediate layer between a network device and an application server, and the management platform is responsible for determining an application server required by a terminal device, that is, a vertical system (an Internet of things system) includes the application server, the management platform, the network device, and the terminal device. The application server establishes a communication connection to the terminal device by using the management platform and the network device. FIG. 3*a* is a diagram of an application scenario according to an embodiment of this application. As shown in FIG. 3*a*, the management platform is implemented in a form of a server. The management platform manages information reported by a plurality of network devices. The management platform determines, based on a second field included in the information, the application server required by the terminal device, so that the management platform assists in establishing the communication connection between the application server and the terminal device.

Figure 3B:
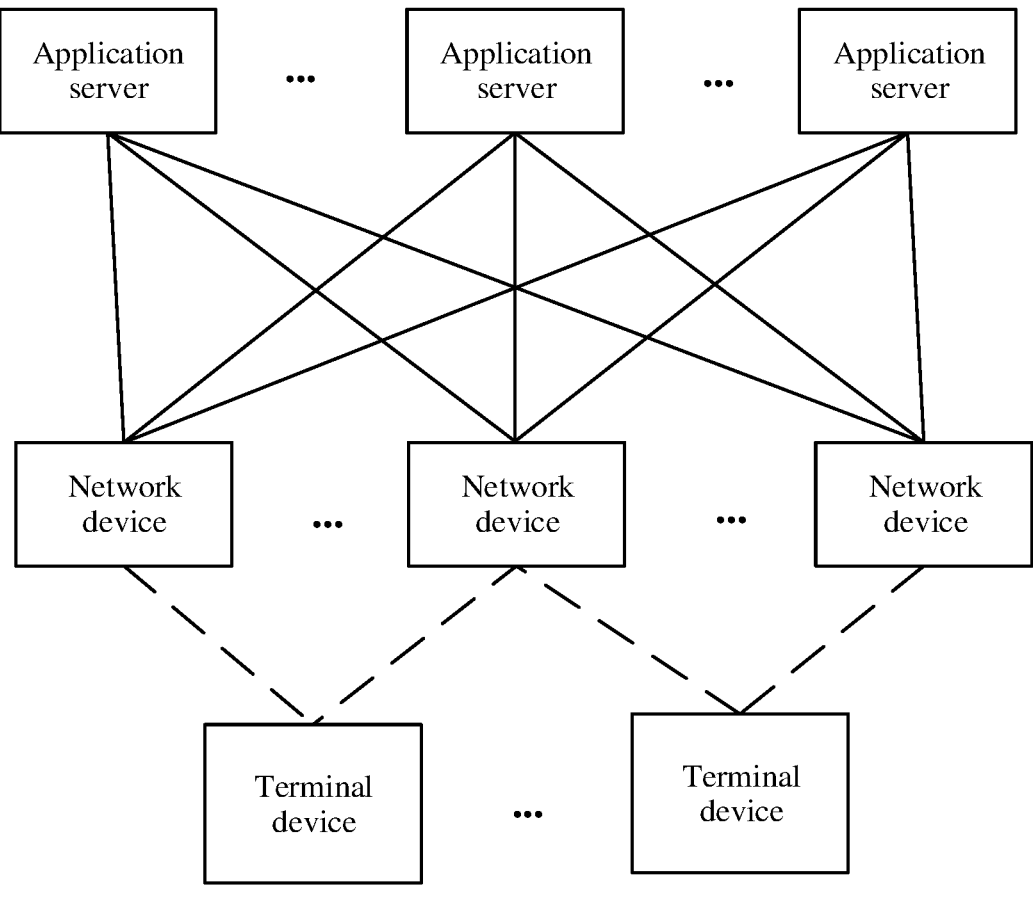
FIG. 3b is a diagram of another application scenario according to an embodiment of this application.

(B) A network device integrates functions of the foregoing management platform. A vertical system (an Internet of things system) includes an application server, a network device, and a terminal device. The vertical system does not include an independent management platform. FIG. 3*b* is a diagram of another application scenario according to an embodiment of this application. As shown in FIG. 3*b*, the management platform is integrated into the network device. The network device manages information reported by the terminal device. The network device determines, based on the information, an application server required by the terminal device, so that the network device assists in establishing a communication connection between the application server and the terminal device.

Figure 7:
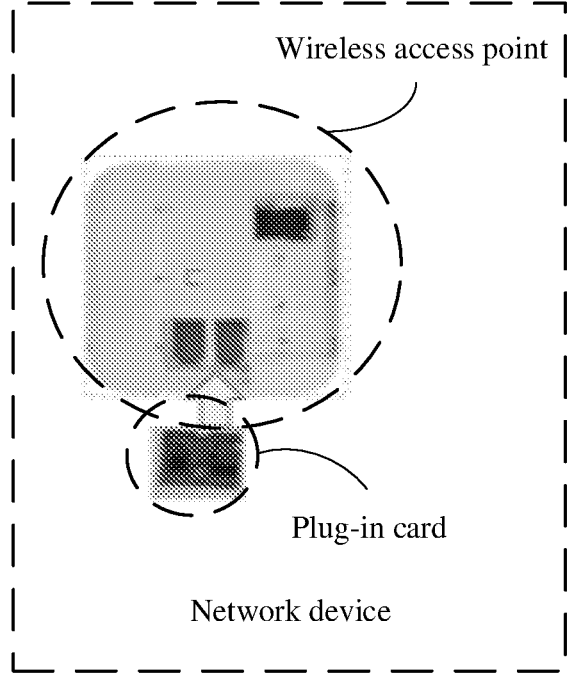
FIG. 7 is a diagram of a network device according to an embodiment of this application.

Further, the network device may further support an extension function of a hardware module. The hardware module may be referred to as a plug-in card. For ease of understanding, FIG. 7 is a diagram of a network device according to an embodiment of this application. The network device includes a wireless access point (AP) and the plug-in card. The wireless access point includes one or more interfaces for establishing a communication connection to the plug-in card. The wireless access point establishes the communication connection to one or more plug-in cards by using the interface. Different plug-in cards can implement different functions. The following provides examples for description.

For example, a plug-in card A, a plug-in card B, and a plug-in card C are all communication modules that support a Bluetooth protocol. The plug-in card A supports a terminal device of a vendor A. The plug-in card B supports a terminal device of a vendor B. The plug-in card C supports a terminal device of a vendor C.

In still another example, the plug-in card A, the plug-in card B, and the plug-in card C are all communication modules that support the vendor A, the vendor B, and the vendor C. The plug-in card A is a communication module that supports a Bluetooth protocol. The plug-in card B is a communication module that supports Zigbee protocols. The plug-in card C is a communication module that supports a radio frequency identification RFID protocol.

In still another example, the plug-in card A, the plug-in card B, and the plug-in card C are all communication modules that support a Bluetooth protocol of the vendor A. The plug-in card A is configured to establish a communication connection to an infant wristband of the vendor A. The plug-in card B is configured to establish a communication connection to a doctor workstation of the vendor A. The plug-in card C is configured to establish a communication connection to a smart bed card of the vendor A.

Functions of a management platform include but are not limited to: data dispensation between the network device and an application server; mapping management between the network device and the application server; and management of the terminal device, the network device, and the application server, for example, an alarm, data display, message push, or security management. The management platform may be further used to manage the plug-in card in each network device. For example, for a relationship between each network device managed by the management platform and each plug-in card in the network device, refer to Table 1.

TABLE 1

| Network device | Plug-in card | Supported vendor type | Supported device type | Supported protocol type |
|---|---|---|---|---|
| 01 | 01/02/03 | A | RFID tag/Doctor workstation/ Healthcare personnel wristband | Bluetooth |
| 02 | 05/06/07 | A/B/C | Doctor workstation | Bluetooth/ Zigbee/RFID |
| 03 | 08/09 | A/B | Infant wristband/ Mother wristband | Bluetooth |

Figure 4:
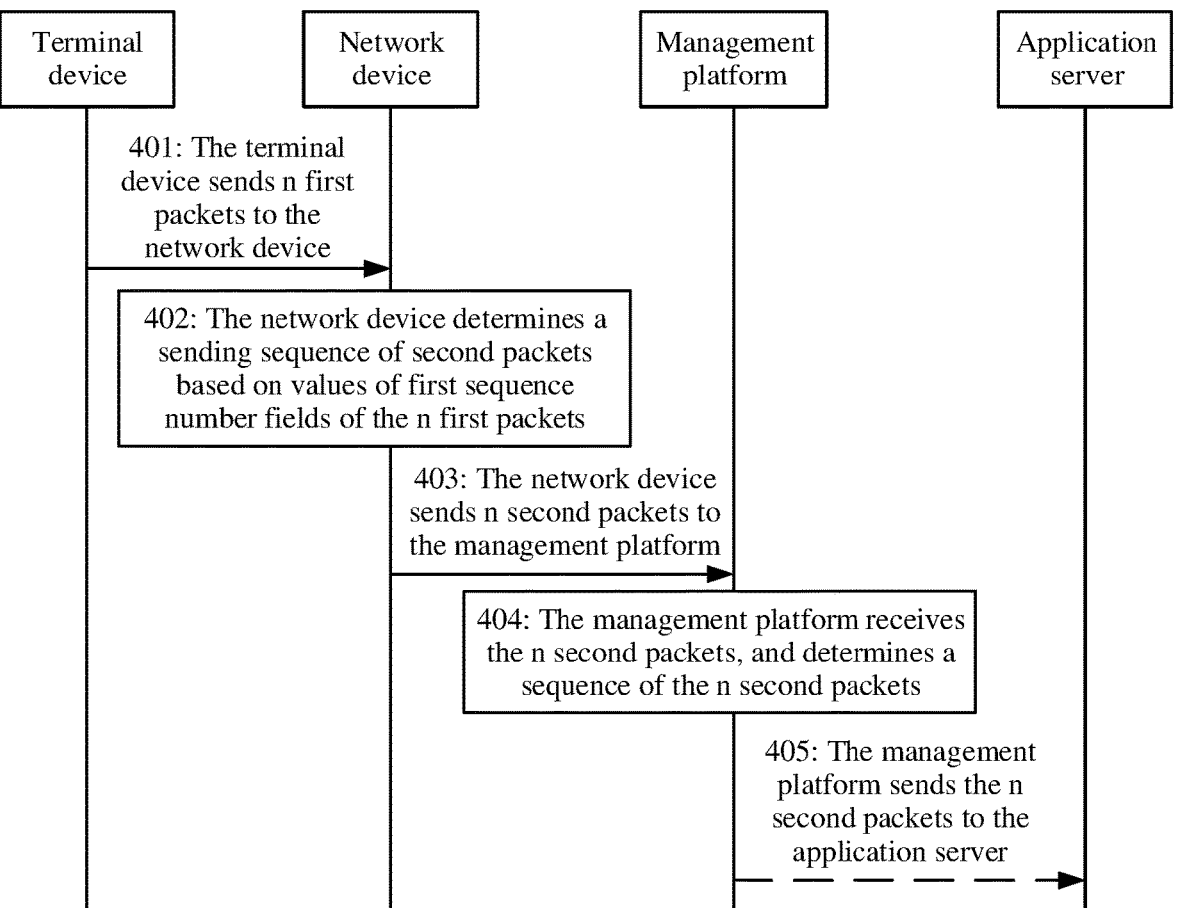
FIG. 4 is a diagram of an embodiment of a packet processing method according to an embodiment of this application.

The following describes embodiments corresponding to different implementation solutions with reference to the accompanying drawings. First, the implementation solution (A) is described. FIG. 4 is a diagram of an embodiment of a packet processing method according to an embodiment of this application. The packet processing method provided in this embodiment of this application includes the following steps.

401: A terminal device sends n first packets to a network device.

Further, the terminal device sends the n first packets to the network device. The first packet may be a data packet, a signaling packet, or another packet. This is not limited herein.

The first packet may be the data packet, the signaling packet, or the another packet. This is not limited herein. For example, the first packet is an air interface packet. n is a positive integer greater than 1.

The first packet includes a first sequence number field, and the first sequence number field indicates a sending sequence of the first packet. Each first packet includes one first sequence number field. For example, when the terminal device sends the first packet at a moment 1, a value of the first sequence number field of the first packet is 1; when the terminal device sends the first packet at a moment 2, a value of the first sequence number field of the first packet is 2, where the moment 2 is greater than the moment 1, . . . , and the like. In other words, each time the terminal device sends one first packet, the value of the first sequence number field increases.

For example, the value of the first sequence number field is assigned by a counter in the terminal device. When the value of the first sequence number field in the counter reaches a threshold, for example, a value of the first sequence number field is 256 (represented by 8 bits), the counter is reset to 0 when the value of the first sequence number field continues to increase, that is, a value of the first sequence number field newly generated by the counter is 0, to reduce a field length of the first packet occupied by the first sequence number field.

In another implementation, each time the terminal device sends one first packet, the value of the first sequence number field decreases.

Figure 6:
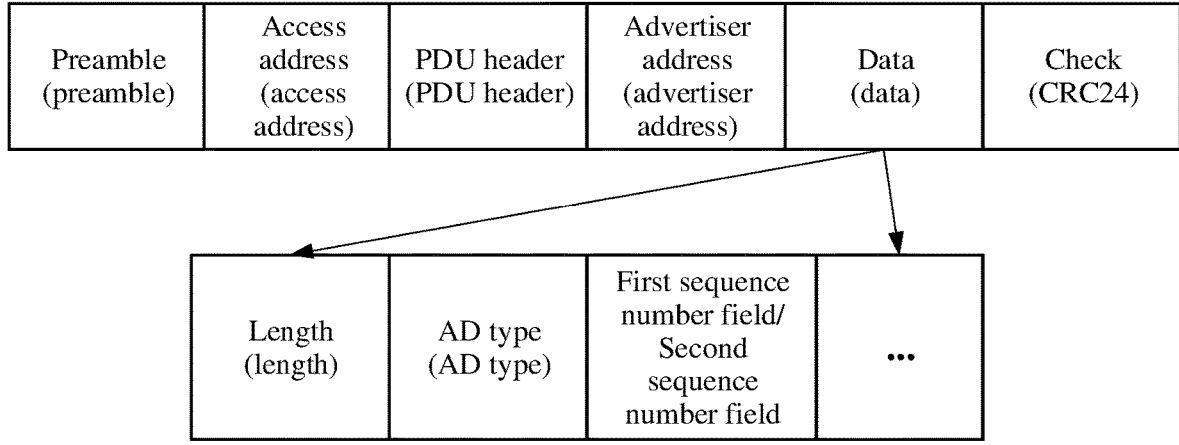
FIG. 6 is a diagram a packet according to an embodiment of this application.

For example, FIG. 6 is a diagram of a packet according to an embodiment of this application. FIG. 6 shows a first packet. The first packet includes one or more of the following fields: a preamble, an access address, a protocol data unit header (PDU header), an advertiser address, data, and check. A CRC24 algorithm may be used for the check. A data field includes a first sequence number field and another field such as a length and an advertisement type (AD Type). In other words, the first sequence number field is located in the data field of the first packet. It should be noted that the first sequence number field may alternatively be located in another field of the first packet. For example, the first sequence number field is located in a reserved field of the first packet. This is not limited herein.

402: The network device determines a sending sequence of second packets based on values of first sequence number fields of the n first packets.

In an implementation, the network device sends n second packets to a management platform or an application server based on a sequence of values of n first sequence number fields included in the n first packets, and n is an integer greater than 1. The network device determines a first sequence based on the values of the n first sequence number fields included in the n first packets. For example, correspondences between first packets and values of the first sequence number field are shown in Table 2.

TABLE 2

| First packet (packet name) | Value of a first sequence number field | Receiving moment |
|---|---|---|
| First packet A | 001 | T1 |
| First packet B | 002 | T2 |
| First packet C | 003 | T4 |
| First packet D | 004 | T3 |

In a normal case, four first packets A, B, C, and D should arrive at the network device in sequence based on a sequence of values of first sequence number fields included in the first packets. However, due to a channel problem between the terminal device and the network device, the first packet C arrives after the first packet D. Therefore, the network device needs to re-sort the four packets based on the values of the first sequence number fields included in the four first packets shown in Table 2, to obtain a first sequence (the sequence is also the sending sequence of the second packets): the first packet A, the first packet B, the first packet C, and the first packet D.

The network device generates the n second packets based on the n first packets, where each second packet includes one second sequence number field, and each of the n second packets corresponds to one first packet.

A value of a second sequence number field included in an $n^{th}$ second packet has an increasing relationship with a value of a second sequence number field included in an $(n-1)^{th}$ second packet, or a value of a second sequence number field included in an $n^{th}$ second packet has a decreasing relationship with a value of a second sequence number field included in an $(n-1)^{th}$ second packet.

Optionally, the second packet is consistent with the first packet. In this embodiment of this application, the network device forwards the first packet, and the first packet sent by the network device is referred to as the second packet. The network device forwards the foregoing four first packets based on the foregoing obtained first sequence.

In an implementation, the terminal device sends m first packets to the network device in a first time period. In the first time period, the network device receives the n first packets sent by the terminal device. Herein, m is greater than or equal to n. In other words, a quantity of first packets actually received by the network device is less than or equal to data of the first packet actually sent by the terminal device. The network device sends the n first packets to the management platform or the application server based on the values of the first sequence number fields of the n received first packets.

For example, the first time period is five seconds. In the first time period, the terminal device sends the four (m=4) first packets to the network device, and the network device receives the four (n=4) first packets sent by the terminal device, that is, m=n=4. For example, the terminal device sends four first packets every five seconds. When the network device receives the four first packets in the first time period (five seconds), the network device determines a sending sequence based on a sequence of values of four first sequence number fields corresponding to the four first packets. The network device sends four second packets based on the sending sequence.

In another implementation, when the terminal device sends m first packets to the network device in a first time period, the network device receives the n first packets sent by the terminal device, where m is greater than n. For example, the first time period is five seconds. The terminal device sends the four (m=4) first packets to the network device. For example, the terminal device sends four first packets every five seconds. However, the network device receives only three (n=3) first packets in the first time period. First packets actually received by the network device in the first time period are the first packet B, the first packet C, and the first packet D. First packets actually received by the network device in the first time period are used as examples in Table 3.

TABLE 3

| First packet (packet name) | Value of a first sequence number field |
|---|---|
| First packet B | 002 |
| First packet C | 003 |
| First packet D | 004 |

The network device determines, based on values of first sequence number fields included in n first packets (the first packet B, the first packet C, and the first packet D), that a sequence of the values of the n first sequence number fields is the first packet B, the first packet C, and the first packet D.

The network device determines the sending sequence of the n second packets based on the sequence of the values of the n first sequence number fields. The network device sends the n second packets to the management platform or the application server based on the sending sequence. The network device generates the n second packets based on the n first packets. The n second packets are the second packet B (corresponding to the first packet B), the second packet C (corresponding to the first packet C), and the second packet D (corresponding to the first packet D). The network device sends the n second packets to the management platform or the application server based on the sequence of the n second packets. A sending sequence is: the second packet B (corresponding to the first packet B), the second packet C (corresponding to the first packet C), and the second packet D (corresponding to the first packet D).

In addition, in a next time period, even if the network device receives a first packet (for example, the first packet A) that does not arrive in a previous period, the first packet is discarded, and is not sorted with a first packet received in a period. For example, in subsequence time (for example, in next five seconds, the network device receives a first packet that is sent by the terminal device and whose value of a first sequence number field ranges from 005 to 008), when the network device receives the first packet A again (that is, a value of a first sequence number field of the first packet is 001), the network device directly discards the first packet A.

In another implementation, when the terminal device sends m first packets to the network device in a first time period, the network device receives the n first packets sent by the terminal device, where m is greater than or equal to n, and n is a quantity of first packets sent by the terminal device to the network device in the first time period. For example, the first time period is five seconds. The network device and the terminal device agree that the terminal device sends the four (m=4) first packets to the network device in the first time period. For example, the terminal device sends the four first packets (the first packet A, the first packet B, the first packet C, and the first packet D) every five seconds. However, the network device receives only three (n=3) first packets in the first time period. First packets actually received by the network device in the first time period are the first packet B, the first packet C, and the first packet D.

The network device discards the n first packets (the first packet B, the first packet C, and the first packet D). The network device receives the first packet from the terminal device in a next first time period, and determines whether to send a second packet (a packet in a previous period, for example, the first packet A is also discarded when received in a current period) to a management platform or an application server.

403: The network device sends the n second packets to the management platform.

Further, the network device sends the n second packets to the management platform or the application server based on the first sequence or a second sequence.

It should be noted that a structure of the second packet may be similar to a structure of the first packet, for example, in a packet structure shown in FIG. 6, the second sequence number field is located in a data field of the second packet. The second packet may alternatively use another packet structure. This is not limited herein.

Optionally, a quantity of second packets is the same as a quantity of first packets.

The second packet includes a second sequence number field, and a value of the second sequence number field indicates a rank of the second packet. Each second packet includes one second sequence number field. For example, the value of the second sequence number field may be a sequence number, and the second sequence number field may be similar to the first sequence number field. When the network device sends the second packet at a moment 1, a value of the second sequence number field of the second packet is 1; when the network device sends the second packet at a moment 2, a value of the second sequence number field of the second packet is 2, where the moment 2 is greater than the moment 1, . . . , and the like. In other words, each time the network device sends one second packet, the value of the second sequence number field increases.

Optionally, when the value of the second sequence number field reaches a threshold, for example, a value of the second sequence number field is 100 or 1000, the value of the second sequence number field is reset to 0, to reduce a field length of the second packet occupied by the second sequence number field.

In another implementation, each time the network device sends one second packet, the value of the second sequence number field decreases. Optionally, the value of the second sequence number field is assigned by a counter in the network device.

In an implementation, a processing capability of the terminal device is limited, and the terminal device is not capable of determining a moment of a service (that is, a timestamp field cannot be generated for the first packet). Therefore, a timestamp can be generated on the network device, and attached to the second packet for the management platform or the server to perform service processing. Therefore, the value of the second sequence number field may be the foregoing timestamp. In addition, when a first packet (for example, the first packet C shown in Table 2) received by the network device is out of order, a management device may select a moment T23 (T2<T23<T3) between moments T2 and T3 as service time of the first packet C. In this case, values of second sequence number fields of second packets corresponding to the first packets shown in Table 2 are respectively T1, T2, T23, and T3.

404: The management platform receives the n second packets, and determines a sequence of the n second packets.

When a transmission control protocol/an Internet protocol (TCP/IP) is used for transmission between the management platform and the network device, that is, the second packet is the TCP/IP packet, because a protocol ensures that transmitted packets are sequential, the management platform can directly process received second packets. For example, after receiving a second packet from the network device, the management platform directly forwards the second packet to the application server. When a user datagram protocol (UDP) is used for transmission between the management platform and the network device, that is, the second packet is a UDP packet, the management platform can sort, based on values of second sequence number fields included in second packets, the n second packets based on the foregoing processing procedure of the network device, and determine a sending sequence based on a sorting result. The management platform sends the n second packets to the application server based on the sending sequence. Details are not described herein again.

405: The management platform sends the n second packets to the application server.

Further, when an Internet of things system further includes the application server, the management platform determines the sending sequence of the n second packets based on the values of the second sequence number fields, and the management platform sends the n second packets to the application server.

In this embodiment of this application, the network device receives the n first packets sent by the terminal device, and each first packet includes one first sequence number field. The network device determines the sending sequence of the n second packets based on the values of the first sequence number fields of the n first packets, and each of the n second packets corresponds to one first packet. The network device sends the second packet to the management platform or the application server based on the sending sequence. A sequence number field used for sorting is added to a packet, so that the network device can learn of an actual sequence in which the terminal device sends packets, to avoid an out-of-order problem, thereby improving reliability of an Internet of things system.

Figure 5:
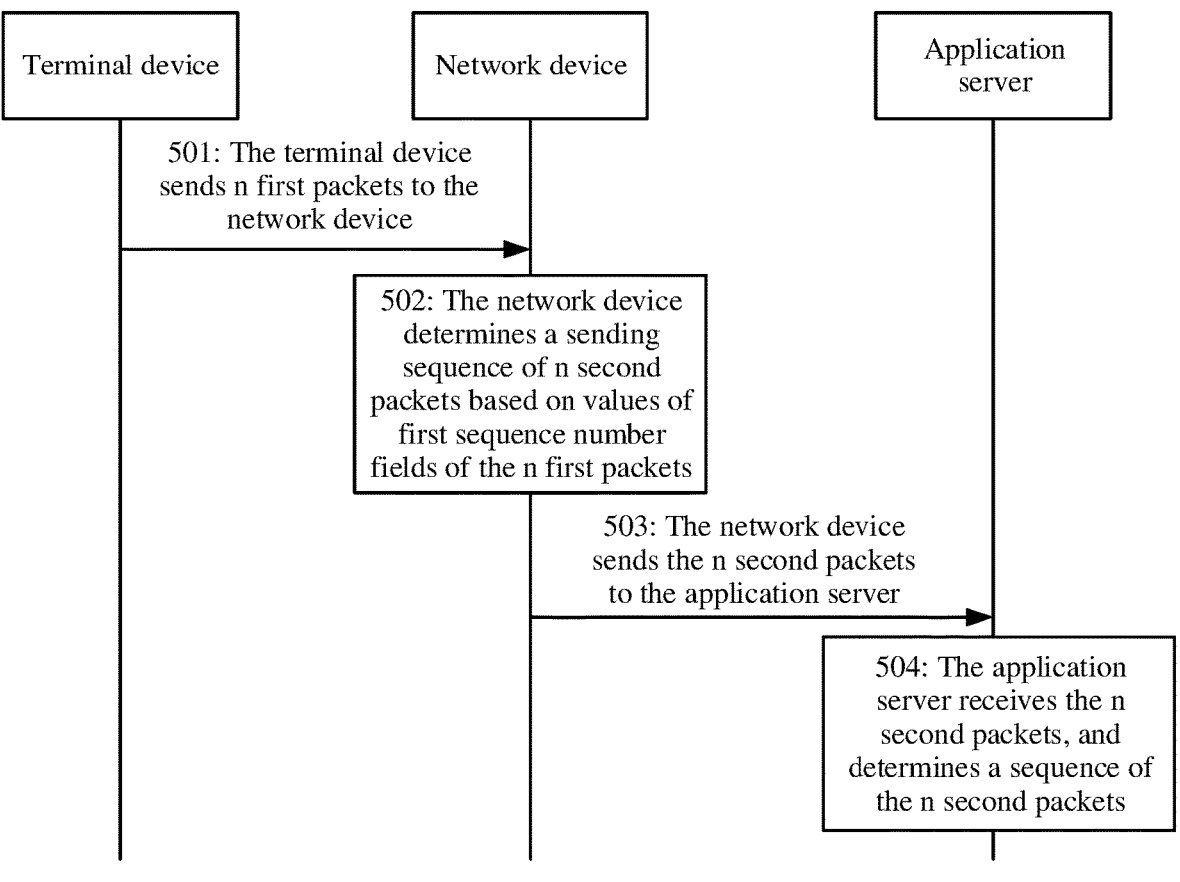
FIG. 5 is a diagram of an embodiment of another packet processing method according to an embodiment of this application.

Another implementation provided in this embodiment of this application is described below with reference to the foregoing embodiments. FIG. 5 is a diagram of an embodiment of another packet processing method according to an embodiment of this application. The embodiment shown in FIG. 5 can be applied to the foregoing application scenario shown in FIG. 3b. The packet processing method provided in this embodiment of this application includes the following steps.

501: A terminal device sends n first packets to a network device.

Step 501 is the same as step 401. Details are not described again.

502: The network device determines a sending sequence of n second packets based on values of first sequence number fields of the n first packets.

Step 502 is the same as step 402. Details are not described again.

503: The network device sends the n second packets to an application server.

Step 503 is similar to step 403. A difference lies in that the network device sends the second packet to the application server. Details are not described herein again.

504: The application server receives the n second packets, and determines a sequence of the n second packets.

Step 504 is similar to step 404. A difference lies in that the application server processes the second packet. Details are not described herein again.

In this embodiment of this application, the network device receives the n first packets sent by the terminal device, and each first packet includes one first sequence number field. The network device determines the sending sequence of the n second packets based on the values of the first sequence number fields of the n first packets, and each of the n second packets corresponds to one first packet. The network device sends the second packet to the application server. A sequence number field used for sorting is added to a packet, so that the network device can learn of an actual sequence in which the terminal device sends packets, to avoid an out-of-order problem, thereby improving reliability of an Internet of things system.

The foregoing mainly describes the solutions provided in embodiments of this application from a perspective of methods. It may be understood that, to implement the foregoing functions, a communication apparatus includes a corresponding hardware structure and/or a software module that performs each function. A person skilled in the art should be easily aware that, in combination with example modules and algorithm steps described in embodiments disclosed in this specification, this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules in the communication apparatus may be obtained through division based on the foregoing method examples. For example, each functional module may be obtained through division based on a corresponding function, or two or more functions may be integrated into one transceiver module. The integrated module may be implemented in a form of hardware, or may be implemented in a form of a software functional module. It should be noted that module division in embodiments of this application is an example and is merely logical function division. During actual implementation, there may be another division manner.

Figure 8:
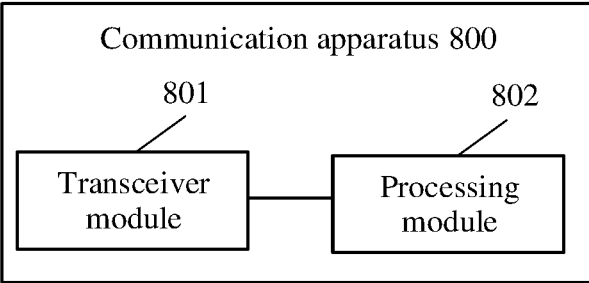
FIG. 8 is a diagram of a communication apparatus according to an embodiment of this application.

The following describes in detail communication apparatuses in this application. FIG. 8 is a diagram of a communication apparatus according to an embodiment of this application. A communication apparatus 800 may be a network device shown in FIG. 1a. The communication apparatus 800 includes:

a transceiver module 801, configured to receive n first packets sent by a terminal device, where each first packet includes one first sequence number field; and a processing module 802, used by the network device to determine a sending sequence of n second packets based on values of first sequence number fields of the n first packets, where each of the n second packets corresponds to one first packet.

The transceiver module 801 is further configured to send the second packet to a management platform or an application server based on the sending sequence.

In an implementation, the transceiver module 801 is configured to receive the n first packets sent by the terminal device in a first time period. When the terminal device sends a total of m first packets to the network device in the first time period, m is greater than or equal to n.

In an implementation, that the transceiver module 801 is further configured to receive the n first packets sent by the terminal device includes: The network device receives the n first packets sent by the terminal device in the first time period. When the terminal device sends a total of m first packets to the network device in the first time period, m is greater than n.

The processing module 802 is further configured to discard the n first packets.

In an implementation, each of the n second packets includes one second sequence number field, and a value of the second sequence number field indicates a rank of the second packet.

In an implementation, the first sequence number field is located in a data field of the first packet, and the second sequence number field is located in a data field of the second packet.

In an implementation, the value of the second sequence number field includes a sequence number and/or a timestamp.

Figure 9:
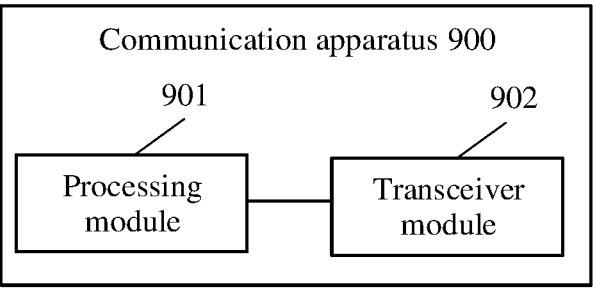
FIG. 9 is a diagram of a communication apparatus according to an embodiment of this application.

FIG. 9 is a diagram of a communication apparatus according to an embodiment of this application. A communication apparatus 900 may be deployed in a terminal device. The communication apparatus 900 includes:

a processing module 901, configured to generate a first packet, where the first packet includes a first sequence number field, a value of the first sequence number field indicates a rank of the first packet, and the first sequence number field is located in a data field of the first packet; and a transceiver module 902, configured to send the first packet to a network device.

In an implementation, the first sequence number field is located in the data field of the first packet.

In an implementation, the processing module 901 is further configured to reset the value of the first sequence number field when the first sequence number field reaches a value of a first threshold.

Figure 10:
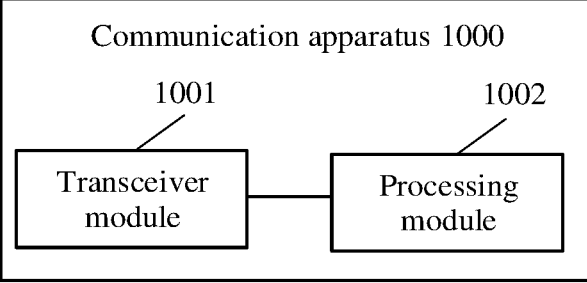
FIG. 10 is a diagram of a communication apparatus according to an embodiment of this application.

FIG. 10 is a diagram of a communication apparatus according to an embodiment of this application. A communication apparatus 1000 may be deployed in a network device. The communication apparatus 1000 includes:

a transceiver module 1001, configured to receive n second packets sent by a network device, where each second packet includes one second sequence number field, a value of the second sequence number field indicates a rank of the second packet, each of the n second packets corresponds to one first packet, and the first packet is an air interface packet received by the network device from a terminal device; and a transceiver module 1001, configured to send the n second packets to an application server based on the sending sequence.

In an implementation, the transceiver module 1001 is configured to receive the n second packets sent by the network device in a second time period. When the network device sends a total of m second packets to a management platform in the second time period, m is greater than or equal to n.

In an implementation, the transceiver module 1001 is configured to receive the n second packets sent by the network device in the second time period. When the network device sends a total of m second packets to the management platform in the second time period, m is greater than n.

A processing module 1002 is configured to discard the n second packets.

In an implementation, the second sequence number field is located in a data field of the second packet.

In an implementation, the value of the second sequence number field includes a sequence number and/or a timestamp.

The communication apparatus in the foregoing embodiments may be a network device, a chip used in the network device, or another combined part, component, or the like that can implement a function of the network device. When the communication apparatus is the network device, the transceiver module may be a transceiver. The transceiver may include an antenna, a radio frequency circuit, and the like. The processing module may be a processor, for example, a baseband chip. When the communication apparatus is a component having the function of the foregoing network device, the transceiver module may be a radio frequency unit, and the processing module may be a processor. When the communication apparatus is a chip system, the transceiver module may be an input port of the chip system, or the transceiver module may be an output interface of the chip system, and the processing module may be a processor, for example, a central processing unit (CPU), of the chip system.

The communication apparatus in the foregoing embodiments may be a terminal device, a chip used in the terminal device, or another combined part, component, or the like that can implement a function of the terminal device. When the communication apparatus is the terminal device, the transceiver module may be a transceiver. The transceiver may include an antenna, a radio frequency circuit, and the like. The processing module may be a processor, for example, a baseband chip. When the communication apparatus is a component having the function of the foregoing terminal device, the transceiver module may be a radio frequency unit, and the processing module may be a processor. When the communication apparatus is a chip system, the transceiver module may be an input port of the chip system, or the transceiver module may be an output interface of the chip system, and the processing module may be a processor, for example, the central processing unit, of the chip system.

It should be noted that content such as information exchange between and execution processes of the modules/components of the communication apparatus is based on a same concept as the method embodiments of this application corresponding to FIG. 4 to FIG. 7. For specific content, refer to the descriptions in the foregoing method embodiments of this application. Details are not described herein again.

It should be noted that for implementations and beneficial effect of the communication apparatus, refer to the descriptions in method embodiments corresponding to FIG. 4 to FIG. 7. Details are not described herein again.

An embodiment of this application further provides a processing apparatus. The processing apparatus includes a processor and an interface. The processor is configured to perform the packet processing method according to one of the foregoing method embodiments.

It should be understood that the processing apparatus may be a chip, and the processor may be implemented by hardware, or may be implemented by software. When implemented by the hardware, the processor may be a logic circuit, an integrated circuit, or the like. When implemented by the software, the processor may be a general-purpose processor, and is implemented by reading software code stored in a memory. The memory may be integrated into the processor, or may exist independently outside the processor.

"Implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, the integrated circuit is usually used for implementation. The hardware processing circuit may include an application-specific integrated circuit (ASIC) or a programmable logic device (PLD). The PLD may further include a field programmable gate array (FPGA), a complex programmable logic device (CPLD), and the like. These hardware processing circuits may be an independently packaged semiconductor chip (for example, packaged into one ASIC), or may be integrated with another circuit (such as a CPU or a DSP) and then packaged into a semiconductor chip. For example, a plurality of hardware circuits and CPUs may be formed on one silicon base, and are independently packaged into one chip, where the chip is also referred to as an SoC; or a circuit that is configured to implement an FPGA function and a CPU may be formed on a silicon base, and the circuit and the CPU are independently packaged into one chip, where the chip is also referred to as a system on a programmable chip (SoPC).

This application further provides a communication system, including at least one or more of a transmit end, a receive end, and an intermediate node.

An embodiment of this application further provides a computer-readable storage medium, including instructions. When the instructions are run on a computer, the computer is enabled to control a network apparatus to perform any implementation shown in the foregoing method embodiments.

An embodiment of this application further provides a computer program product. The computer program product includes computer program code. When the computer program code is run on a computer, the computer is enabled to perform any implementation shown in the foregoing method embodiments.

An embodiment of this application further provides a chip system, including a memory and a processor. The memory is configured to store a computer program, and the processor is configured to invoke the computer program from the memory and run the computer program, to enable a chip to perform any implementation shown in the foregoing method embodiments.

An embodiment of this application further provides a chip system, including a processor. The processor is configured to invoke and run a computer program, to enable a chip to perform any implementation shown in the foregoing method embodiments.

In addition, it should be noted that the foregoing described apparatus embodiments are merely examples. The units described as separate parts may or may not be physically separate, and parts displayed as units may or may not be physical units, may be located in one position, or may be distributed on a plurality of network units. Some or all the modules may be selected based on actual requirements to achieve objectives of the solutions of embodiments. In addition, in the accompanying drawings of apparatus embodiments provided in this application, connection relationships between modules indicate that the modules have communication connections with each other, which may be implemented as one or more communication buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be in various forms, for example, in a form of an analog circuit, a digital circuit, or a dedicated circuit. However, for this application, software program implementation is a better implementation in most cases. Based on such an understanding, the technical solutions of this application essentially or a part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device to perform the methods in embodiments of this application.

All or some of the foregoing embodiments may be implemented by using software, hardware, firmware, or any combination thereof. When the software is used to implement embodiments, all or some of embodiments may be implemented in a form of a computer program product.

The computer program product includes one or more computer instructions. When the computer program instructions are loaded and executed on the computer, procedures or functions according to embodiments of this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, communication apparatus, computing device, or data center to another website, computer, communication apparatus, computing device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a communication apparatus or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that "one embodiment" or "an embodiment" mentioned throughout the specification means that specified features, structures, or features related to the embodiment are included in at least one embodiment of this application. Therefore, "in one embodiment" or "in an embodiment" appearing throughout the specification does not necessarily refer to a same embodiment. In addition, these specified features, structures, or features may be combined in one or more embodiments in any appropriate manner. It should be understood that, in embodiments of this application, sequence numbers of the foregoing processes do not mean execution sequences. The execution sequences of the processes should be determined based on functions and internal logic of the processes, and should not be construed as any limitation on implementation processes of embodiments of this application.

A person of ordinary skill in the art may be aware that, in combination with the examples described in embodiments disclosed in this specification, units and algorithm steps can be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for ease and brevity of description, for working processes of the system, apparatus, and unit described above, refer to the corresponding processes in the foregoing method embodiments. Details are not described herein again.

In the several embodiments provided in this application, it should be understood that the disclosed system, apparatus, and method may be implemented in other manners. For example, apparatus embodiments described above are merely examples. For example, unit division is merely logical function division, and there may be another division manner during actual implementation. For example, a plurality of units or components may be combined or may be integrated into another system, or some features may be ignored or not performed. In addition, displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network units. Some or all the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and is sold or used as an independent product, the integrated unit may be stored in one computer-readable storage medium. Based on such an understanding, the technical solutions of this application essentially, or the part contributing to the conventional technology, or all or some of the technical solutions may be implemented in the form of the software product. The computer software product is stored in one storage medium and includes the several instructions for instructing the computer device (which may be a personal computer, a server, a network device, or the like) to perform all or some of the steps of the methods in embodiments of this application.

What is claimed is:

1. A packet processing method, comprising:
receiving, by a network device, n first packets sent by a terminal device, each first packet comprising one first sequence number field, n being a positive integer, wherein the receiving the n first packets sent by the terminal device comprises: receiving, in a first time period, the n first packets sent by the terminal device, wherein when the terminal device sends a total of m first packets to the network device in the first time period, m is greater than or equal to n, and m is a positive integer;
determining, by the network device, a sending sequence of n second packets based on values of first sequence number fields of the n first packets, each second packet of the n second packets corresponding to a first packet of the n first packets; and
sending, by the network device, the n second packets to a management platform or to an application server based on the sending sequence.

2. The method according to claim 1, wherein m is greater than n; and
the method further comprises discarding, by the network device, the n first packets.

3. The method according to claim 1, wherein each second packet of the n second packets comprises one second sequence number field, a value of the second sequence number field indicating a rank of the second packet.

4. The method according to claim 3, wherein:
the first sequence number field is located in a first packet data field of the first packet; and
the second sequence number field is located in a second packet data field of the second packet.

5. The method according to claim 4, wherein the value of the second sequence number field comprises a sequence number and/or a timestamp.

6. A packet processing method, comprising:
generating, by a terminal device, a first packet, the first packet comprising a first sequence number field, a value of the first sequence number field indicating a rank of the first packet, the first sequence number field being located in a first packet data field of the first packet; and
sending, by the terminal device, the first packet to a network device.

7. The method according to claim 6, wherein the method further comprises:
resetting the value of the first sequence number field when the value of the first sequence number field reaches a first threshold.

8. A communication apparatus, comprising:
a memory storing instructions; and
at least one processor in communication with the memory, the at least one processor configured, upon execution of the instructions, to perform the following steps:
receive n first packets sent by a terminal device, each first packet comprising one first sequence number field, n being a positive integer, wherein the receive the n first packets sent by the terminal device comprises: receive, in a first time period, the n first packets sent by the terminal device, wherein when the terminal device sends a total of m first packets to the network device in the first time period, m is greater than or equal to n, and m is a positive integer;
determine a sending sequence of n second packets based on values of first sequence number fields of the n first packets, each second packet of the n second packets corresponding to a first packet of the n first packets; and
send the n second packets to a management platform or to an application server based on the sending sequence.

9. The communication apparatus according to claim 8, wherein m is greater than n; and the at least one processor further executes the instructions to perform the step of discarding the n first packets.

10. The communication apparatus according to claim 8, wherein each second packet of the n second packets comprises one second sequence number field, a value of the second sequence number field indicating a rank of the second packet.

11. The communication apparatus according to claim 10, wherein:

the first sequence number field is located in a first packet data field of the first packet; and the second sequence number field is located in a second packet data field of the second packet.

12. The communication apparatus according to claim 11, wherein the value of the second sequence number field comprises a sequence number and/or a timestamp.

* * * * *